United States Patent
Xu et al.

(10) Patent No.: US 9,542,238 B2
(45) Date of Patent: Jan. 10, 2017

(54) SYSTEMS AND METHODS FOR DIRECT MEMORY ACCESS COHERENCY AMONG MULTIPLE PROCESSING CORES

(71) Applicants: Kun Xu, Austin, TX (US); Tommi M. Jokinen, Austin, TX (US); Zheng Xu, Austin, TX (US)

(72) Inventors: Kun Xu, Austin, TX (US); Tommi M. Jokinen, Austin, TX (US); Zheng Xu, Austin, TX (US)

(73) Assignee: NXP USA, Inc., Austin, TX (US)

( * ) Notice: Subject to any disclaimer, the term of this patent is extended or adjusted under 35 U.S.C. 154(b) by 504 days.

(21) Appl. No.: 13/900,761

(22) Filed: May 23, 2013

(65) Prior Publication Data

US 2014/0351825 A1    Nov. 27, 2014

(51) Int. Cl.
*G06F 9/46* (2006.01)
*G06F 9/52* (2006.01)
*G06F 9/48* (2006.01)
*G06F 9/50* (2006.01)

(52) U.S. Cl.
CPC ............. *G06F 9/526* (2013.01); *G06F 9/52* (2013.01); *G06F 9/46* (2013.01); *G06F 9/4843* (2013.01); *G06F 9/4881* (2013.01); *G06F 9/5016* (2013.01)

(58) Field of Classification Search
CPC ........................................................ G06F 9/46
USPC .... 718/102, 103, 104, 106, 107; 710/22, 23, 710/200, 210, 28, 260; 711/151, 152
See application file for complete search history.

(56) References Cited

U.S. PATENT DOCUMENTS

| | | | |
|---|---|---|---|
| 6,529,968 B1* | 3/2003 | Anderson | 710/22 |
| 6,725,457 B1 | 4/2004 | Priem et al. | |
| 6,807,587 B1* | 10/2004 | Murray | G06F 13/28 710/22 |
| 7,353,515 B1* | 4/2008 | Ton | G06F 9/52 718/100 |
| 7,836,238 B2 | 11/2010 | Freimuth et al. | |
| 8,127,052 B2* | 2/2012 | Yoshioka | G06F 13/28 710/20 |
| 2006/0271712 A1* | 11/2006 | Wezelenburg | G06F 9/5016 710/22 |
| 2008/0005741 A1* | 1/2008 | Terrell | G06F 9/526 718/102 |
| 2008/0288691 A1* | 11/2008 | Bie et al. | 710/200 |
| 2009/0150873 A1* | 6/2009 | Taneda | G06F 9/45508 717/148 |
| 2009/0187793 A1* | 7/2009 | Dohji et al. | 714/42 |
| 2009/0282407 A1* | 11/2009 | Hayashi | 718/100 |
| 2010/0110083 A1* | 5/2010 | Paltashev | G06F 9/30072 345/506 |
| 2011/0154346 A1* | 6/2011 | Jula | 718/103 |

(Continued)

*Primary Examiner* — Abu Ghaffari

(57) ABSTRACT

A multi-core system configured to execute a plurality of tasks and having a semaphore engine and a direct memory access (DMA) engine capable of selecting, by a task scheduler of a first core, a first task for execution by the first core. In response to a semaphore lock request, the task scheduler of the first core switches the first task to an inactive state and selects a next task for execution by the first core. After the semaphore engine acquires the semaphore lock of the first semaphore, a data transfer request is provided to the DMA engine. In response to the data transfer request, the DMA engine transfers data associated with the locked first semaphore to the entry of the workspace of the first core.

18 Claims, 4 Drawing Sheets

(56) References Cited

U.S. PATENT DOCUMENTS

| | | | |
|---|---|---|---|
| 2011/0219150 A1* | 9/2011 | Piccirillo | G06F 13/28 710/24 |
| 2012/0159487 A1* | 6/2012 | Bates | G06F 9/526 718/100 |
| 2012/0230341 A1* | 9/2012 | Mital | G06F 9/3009 370/400 |
| 2012/0271972 A1* | 10/2012 | Eilebrecht | 710/18 |
| 2012/0271973 A1* | 10/2012 | Adachi | G06F 13/28 710/22 |
| 2014/0109102 A1* | 4/2014 | Duncan | G06F 9/3851 718/103 |

* cited by examiner

SYSTEMS AND METHODS FOR DIRECT MEMORY ACCESS COHERENCY AMONG MULTIPLE PROCESSING CORES

BACKGROUND

Field

This disclosure relates generally to multi-core processing devices, and more specifically, to systems and methods for direct memory access coherency among multiple processing cores.

Related Art

The complexity of integrated circuits has dramatically increased during the last decade. System-on-chip and other multiple-core integrated circuits are being developed in order to support various applications such as but not limited to multimedia applications, networking, real time applications and the like.

Modern integrated circuits are capable of executing a large number of tasks substantially in parallel. A multiple channel Direct Memory Access (DMA) controller can manage multiple data transfers while reducing the load from the integrated circuit cores (processors). In some cases, multiple tasks may need to use the same data at approximately the same time. While some multi-core systems include cache memory that maintain data coherency between tasks, cache memory may require more space and computing resources than available in a particular architecture. It is therefore desirable to provide DMA memory that is capable of insuring the most recent (coherent) data is accessed by each of multiple tasks accessing the same data.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In embodiments of systems and methods disclosed herein, data in system memory is shared between tasks and threads in a multi-core processing system even though the processing system does not include coherent cache or coherent switch capabilities. Instead, a semaphore engine is coupled to a direct memory access (DMA) engine to ensure the most recent data is shared between tasks in the cores. Each core can include a private workspace memory with entries for each task to use a shadowed copy of the data via DMA operation. Mutual exclusive accesses are coordinated by the semaphore engine to ensure that no two tasks/threads access the shared memory variables at the same time. Tasks make specialized function calls to bind a semaphore with corresponding shared memory variables and their copies in private workspace memory for each task. Context switching is used to prevent a task from using data from its workspace until the data requested has been transferred by a DMA engine. After semaphore and DMA operations are completed, the task is switched to "ready for scheduling" for execution subject to task scheduling.

Figure 1:
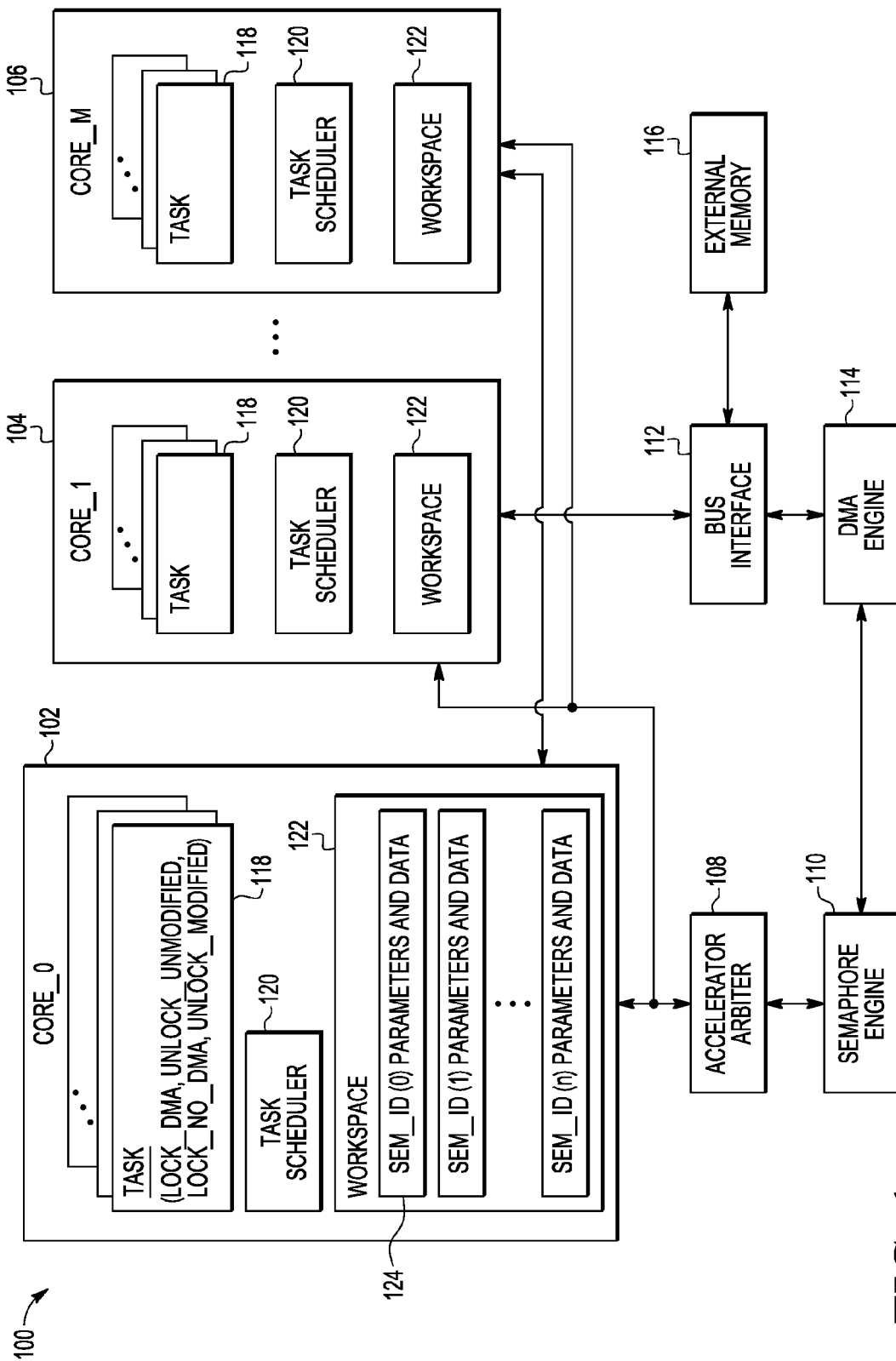
FIG. 1 is a block diagram of a multi-core processing system in accordance with an embodiment of the disclosure.

FIG. 1 is a block diagram of a multi-core processing system 100 in accordance with an embodiment of the disclosure including one or more processing cores 102, 104, 106, accelerator arbiter 108, semaphore engine 110, bus interface 112, DMA engine 114 and external memory 116. Accelerator arbiter 108 is bi-directionally coupled between semaphore engine 110 and cores 102, 104, 106. Semaphore engine 110 is also coupled bi-directionally to DMA engine 114. Bus interface 112 is coupled for bi-directional communication with DMA engine 114, external memory 116, and cores 102-106.

Processing system 100 may include one, two, or any number of processing cores 102, 104, 106. If a plurality of processing cores 102-106 are used in computer processing system 100, any number of them may be the same, or different. Processing cores 102-106 can execute a plurality of instruction sets in threads, tasks and/or programs. In the example shown, processing cores 102-106 execute one or more tasks 118 that may be part of a thread. Cores 102-106 also include task scheduler 120 and workspace 122. Workspace 122 includes multiple memory segments 124 that may be allocated by a task 118 when DMA engine 114 transfers data. Memory segments 124 can be used to store a semaphore identifier (SEM_ID), various parameters, and the data requested by the task 118.

Task scheduler 120 handles context switching between tasks based on priority and/or whether a task is waiting for DMA engine 114 to copy data into the task's workspace 122 or is finished consuming data from DMA engine 114. A task may be switched to inactive status when waiting for DMA data, returned to active status when the data is available, switched back to inactive when finished using the data, and then returned to ready for scheduling when the data is copied from the task's workspace 122, as required.

Tasks 118 may invoke or call specialized memory functions including LOCK_DMA, LOCK_NO_DMA, UNLOCK_UNMODIFIED and UNLOCK_MODIFIED. The LOCK_DMA function is used to perform a DMA operation to copy data from external memory 116 to a private workspace while preventing other tasks from accessing the same data in external memory 116 until the current task is finished with the data. When invoking the LOCK_DMA function, the task may supply as arguments in the function call a semaphore identifier (SEM_ID) corresponding to the task, an address in the workspace where the data should be delivered, and the amount of data requested.

When invoking the LOCK_NO_DMA function, the task may supply a semaphore identifier (SEM_ID) corresponding to the task as an argument in the function call. The LOCK_NO_DMA function may be used to acquire a lock without moving data. For example, the LOCK_NO_DMA function can be used for synchronization purposes.

The UNLOCK_UNMODIFIED function is used by a task to indicate the task is finished with the data, and the data has not been modified by the task. When invoking the UNLOCK_UNMODIFIED function, the task may supply as arguments in the function call a semaphore identifier (SEM_ID), an address in the task's workspace where the data should be copied from if the data is being requested by another task, and the amount of data to be copied. The data may be transferred from the workspace 122 of the completing task to the workspace 122 of the pending task. If another task is not requesting the data, then the data is not copied to another workspace 122 or external memory 116.

The UNLOCK_MODIFIED function is used by a task to indicate the task is finished with the data and the data has been modified by the task. When invoking the UNLOCK_MODIFIED function, the task may supply as arguments in the function call a semaphore identifier (SEM_ID), an address in the workspace where the data should be copied from, and the amount of data requested. If there is no task waiting for the modified data, DMA engine 114 copies the data to external memory 116.

Accelerator arbiter 108 schedules DMA memory requests from cores 102-106, and tasks 118 within cores 102-106 according to the priority of tasks 118 and cores 102-106.

Semaphore engine 110 provides an interface between DMA engine 114 and accelerator arbiter 108 by maintaining lists of tasks 118 currently using specified data, and tasks 118 waiting to use the specified data. As one task 118 finishes using the specified data, semaphore engine 110 allows a next waiting task 118 to use the data. Tasks 118 may be scheduled on a first come, first served basis, or other suitable basis. Semaphore engine 110 can coordinate usage of data between tasks 118 in multiple cores 102-106.

Bus interface 112 can include a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

External memory 116 can be implemented with one or more of various types of SDRAM or other suitable type of memory that is directly accessible by DMA engine 114. DMA engine 114 can also read/write data in workspace 122 and transfer data between task entries 124 in workspace 122 in a single core as well as between cores 102-106.

Figure 2:
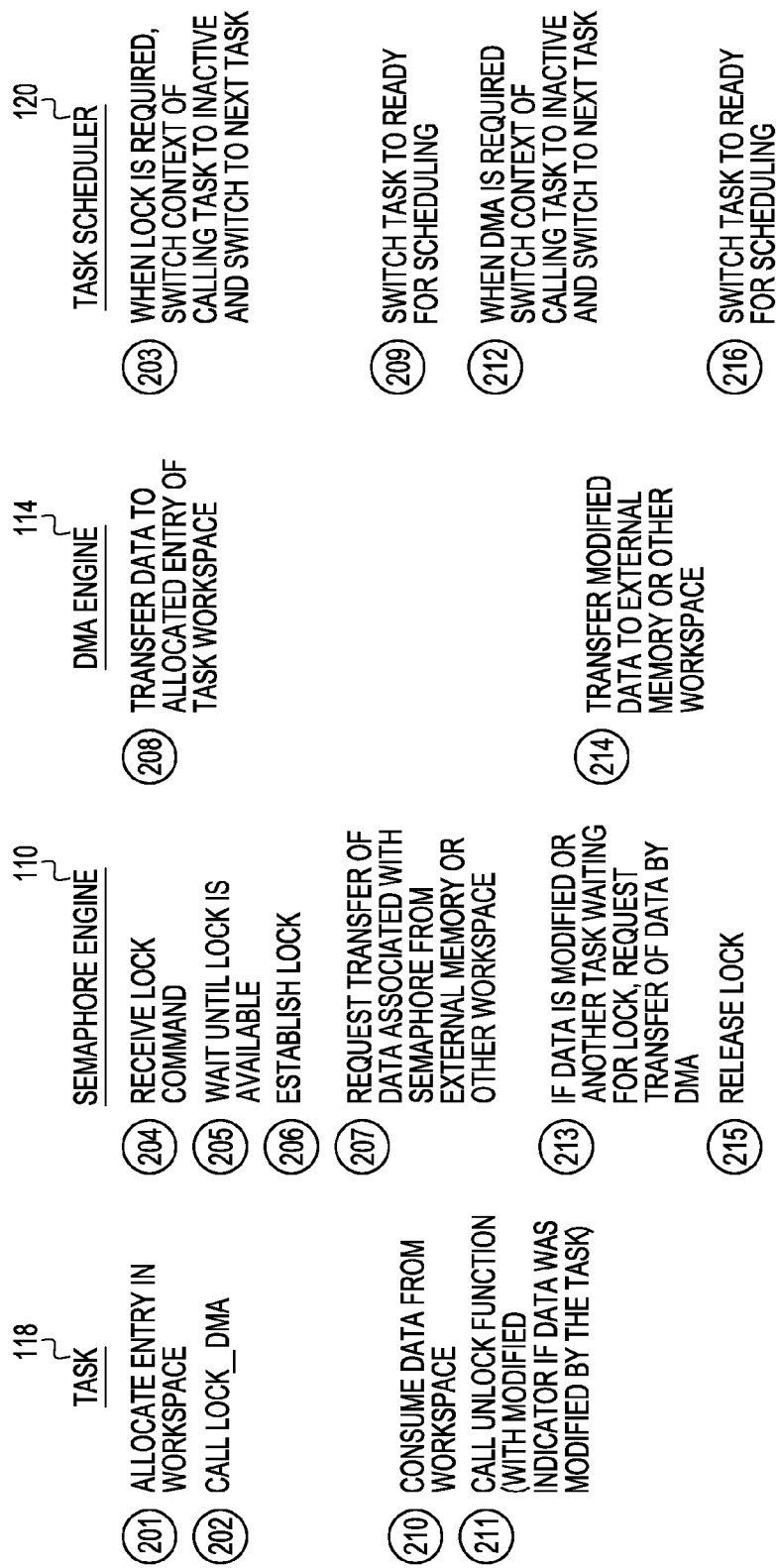
FIG. 2 is a flow diagram of functions that can be performed by components in the multi-core processing system of FIG. 1.

Referring to FIGS. 1 and 2, FIG. 2 is a flow diagram of processes that can be performed by components in the multi-core processing system 100 of FIG. 1 for coherent data transfers using DMA engine 114. Task 118 performs process 201 by allocating an entry 124 in workspace 122. Entries 124 may be allocated in the order the entries 124 are requested. Task 118 then calls the LOCK_DMA function in process 202. To begin placing a lock on the data being requested, task scheduler 120 switches the context of the calling task 118 to inactive and activates a next task that is ready for scheduling in process 203. Semaphore engine 110 receives a LOCK command from task scheduler 120 via accelerator arbiter 108 in process 204 and waits until the requested data is available in process 205. If the data is currently locked by another task 118, semaphore engine 110 can place information associated with the task 118 in a pending list or table awaiting availability of the data. Additionally, if the task 118 already has a semaphore lock allocated, semaphore engine 110 can place information associated with the task 118 in the pending list or table awaiting availability of a semaphore. When the requested data becomes available, or a semaphore becomes available for the task 118, semaphore engine 110 allocates a semaphore lock on the requested data to the task 118 in process 206. Each task 118 may more than one pending request for a semaphore lock.

Information regarding the semaphore lock and associated task 118 can be stored in another list or table in semaphore engine 110. Alternatively, the pending list may be updated to show that a semaphore lock has been established for the task 118 and the task 118 is no longer pending. Semaphore engine 110 can then communicate with DMA engine 114 in process 207 to request transfer of the requested data from external memory, or from the workspace entry 124 of a task 118 that just finished using the data being requested.

In process 208, DMA engine 114 transfers the requested data to the workspace entry 124 allocated to the task 118. Once the data transfer is complete, the task is deemed to have obtained the semaphore lock and task scheduler 120 switches the context of the task 118 to ready for scheduling in process 209. The task 118 consumes the data by reading from and/or writing to the allocated workspace entry 124 in process 210. Once the data is consumed, the task 118 then calls one of the UNLOCK functions to release the semaphore lock in process 211. If the data was modified, then the task 118 can invoke UNLOCK_MODIFIED function, otherwise, the UNLOCK_UNMODIFIED function can be invoked. If the UNLOCK_MODIFIED function is called, task scheduler switches the context of the task 118 to inactive and switches the context in the next task ready for scheduling to active in process 212. Semaphore engine 110 requests DMA engine 114 to transfer the data in process 213 if the data has been modified or another task is waiting for a semaphore lock to access the data. In process 214, DMA engine 114 transfers the modified data from the specified workspace entry 124 to another entry 124 in a workspace 122 associated with a next task 118 requesting the data, or to external memory 116.

In process 215, semaphore engine 110 releases the semaphore lock allocated to the current task 118. In process 216, task scheduler 120 switches the context of the current task 118 from inactive to ready for scheduling.

Figure 3:
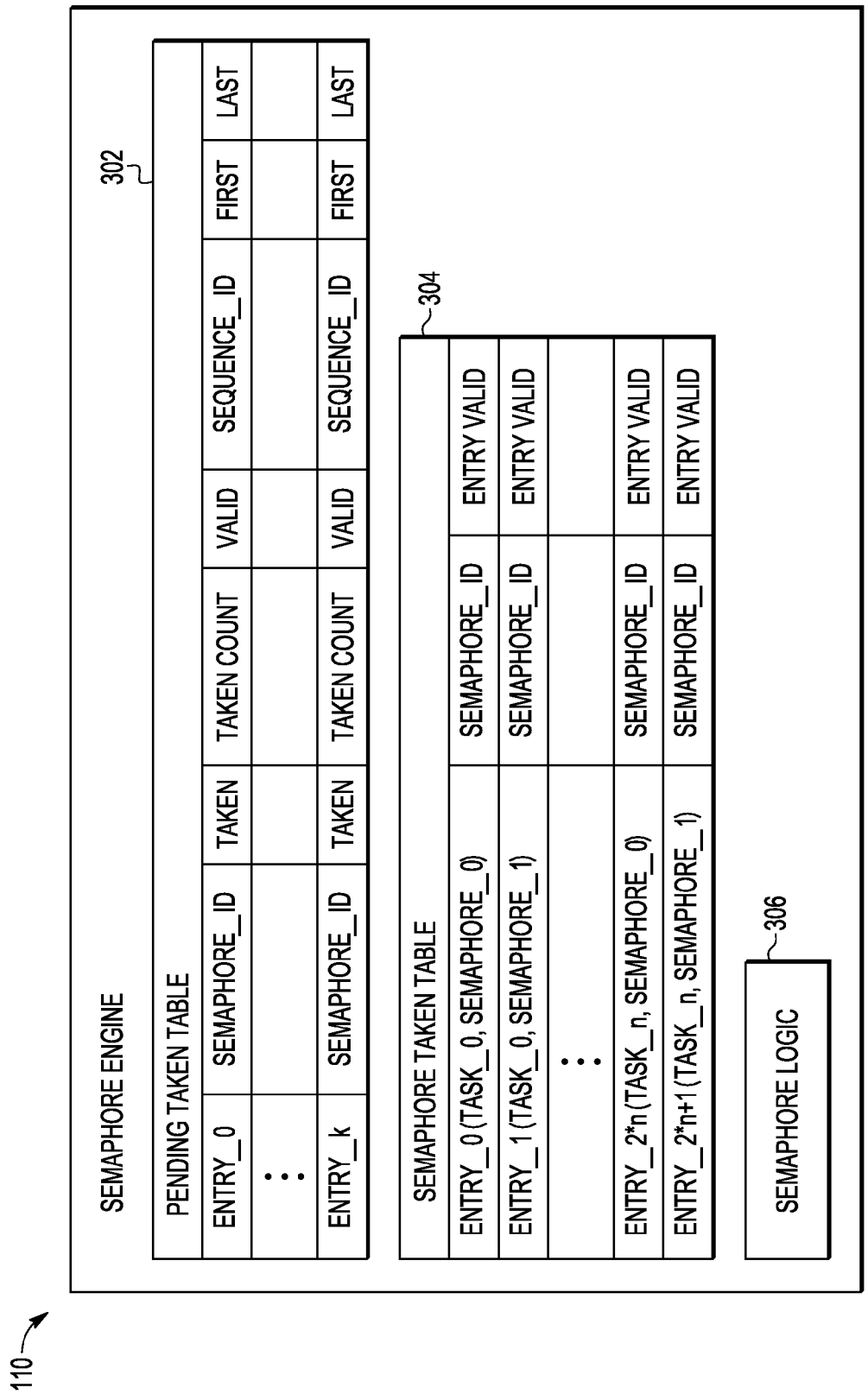
FIG. 3 is a block diagram of an embodiment of a semaphore engine that can be used in the multi-core processing system of FIG. 1.

Referring to FIGS. 1 and 3, FIG. 3 is a block diagram of an embodiment of a semaphore engine 110 that can be used in the multi-core processing system 100 of FIG. 1. In the example shown, semaphore engine 110 includes pending taken table (PTT) 302, semaphore taken table (STT) 304, and semaphore logic 306. STT 304 are used PTT 302 includes a number of entries that are available for use by tasks 118 in cores 102-106. Each task 118 can allocate a number of entries in PTT 302. In some embodiments, each task 118 can allocate up to two entries in PTT 302, however, any other suitable number of entries can be allocated to a single task 118 can be used. The total number of entries available can be the number of tasks 118 that could execute simultaneously in cores 102-106 times the number of entries available for allocation to each task 118. Other suitable numbers of entries can be used, however.

In some embodiments, each entry in PTT 302 includes an entry number (e.g. Entry_0 through Entry_k), a Semaphore Identifier (also referred to herein as "SEM_ID"), a TAKEN parameter, a TAKEN_COUNT parameter, a VALID indicator, a Sequence Identifier (SEQ_ID), a FIRST indicator, and a LAST indicator.

The entries in PTT 302 are used by tasks 118 that are waiting for a semaphore. A task 118 may be waiting for a semaphore when the task 118 is currently using the maximum allowable number of semaphores or another task 118 is using data that the task 118 is requesting. There is only one pending semaphore per task 118. The SEQ_ID parameter and FIRST/LAST indicators allow semaphore logic 306 to arbitrate which task 118 acquires a semaphore next. The SEQ_ID indicates which of a number of tasks waiting for a semaphore lock on the same data arrived before the other. The FIRST indicator indicates that the task associated with the entry is the next in line to acquire a semaphore. The LAST indicator indicates the task associated with the entry is the most recent task to request a semaphore.

Each entry in STT 304 can include an ENTRY number indexed by a task identifier and a semaphore number for the task, the SEM_ID, and an ENTRY VALID indicator. The entries in STT 304 are used by tasks 118 that have acquired a semaphore until the task 118 de-allocates the semaphore using one of the UNLOCK functions.

Figure 4:
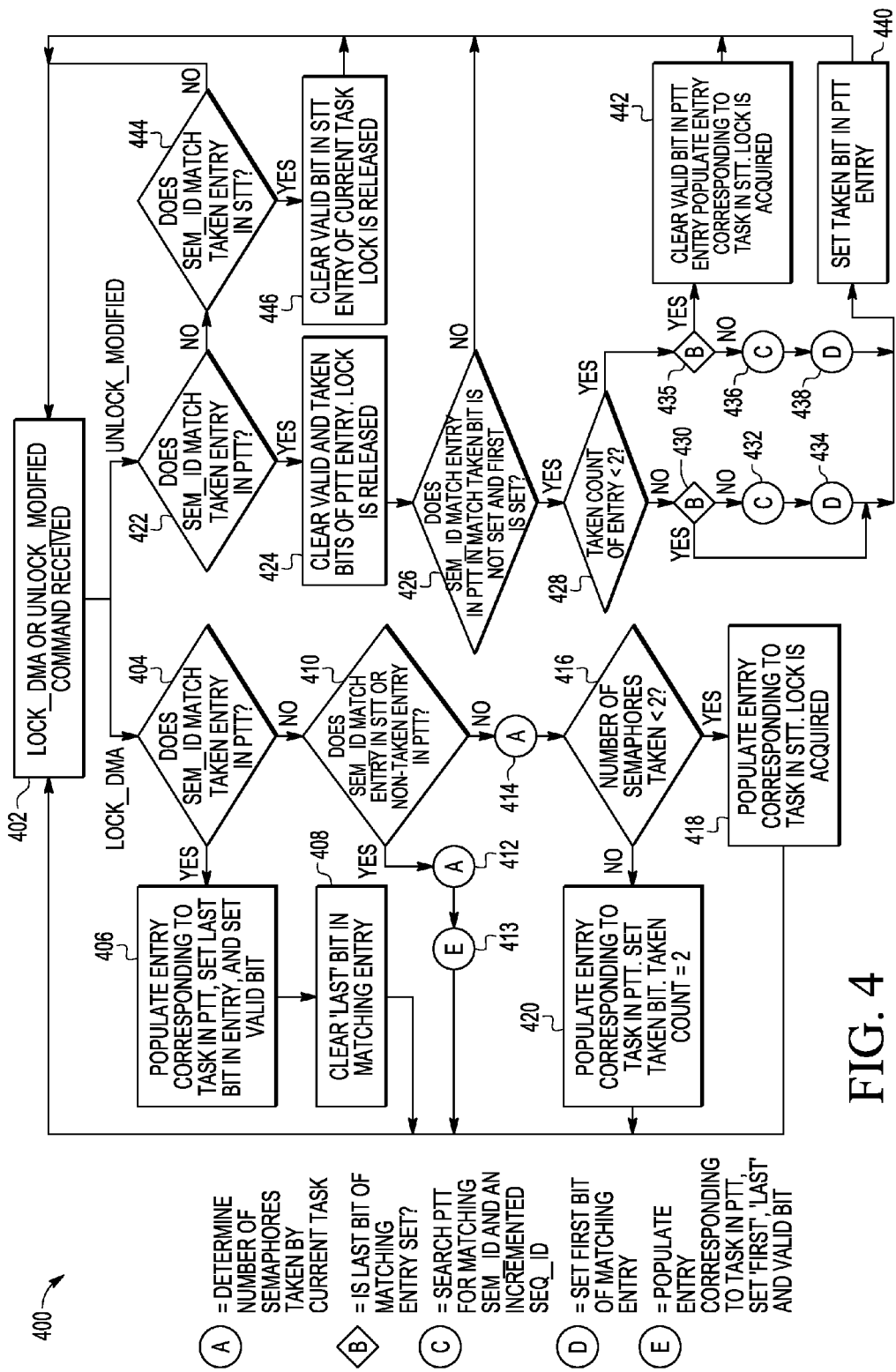
FIG. 4 is a diagram of an embodiment of a method that can be performed by the multi-core processing system of FIG. 1.

Referring to FIGS. 3 and 4, an example of the use of PTT 302 and STT 304 is shown in FIG. 4 as a flow diagram of an embodiment of a method 400 that can be performed by the multi-core processing system of FIG. 1, and in particular by semaphore logic 306. In process 402, a LOCK_DMA or an UNLOCK_MODIFIED command is received. The LOCK_DMA command includes a starting address and an amount of data being requested. Semaphore logic 106 assigns a unique a semaphore identifier (SEM_ID) to the address range. If another LOCK_DMA command is received that overlaps the address range for a currently allocated SEM_ID, then the same SEM_ID is assigned to the new task. Otherwise, a different SEM_ID is assigned to tasks requesting data from other addresses. When the LOCK_DMA command is received, process 404 determines whether the SEM_ID allocated to the requesting task matches the SEM_ID of a "taken" entry in PTT 302. An entry is deemed to be taken when the TAKEN indicator is set in the corresponding PTT entry. If the SEM_ID matches an entry in PTT 302, process 406 populates an entry corresponding to the task in PTT 302, sets the LAST and VALID indicators in the entry to indicate this is the latest task to request the data and the request is current. In process 408, the LAST indicator is cleared in the matching entry. After process 408 is complete, process 408 transitions to process 402.

Referring back to process 404, if the SEM_ID of the currently requesting task does not match a taken entry in PTT 302, process 410 determines whether the SEM_ID allocated to the requesting task matches the SEM_ID of an entry in STT 304 or a non-taken entry in PTT 302. If the SEM_ID matches an entry in STT 304 or a non-taken entry in PTT 302, process 410 transitions to process 412 to determine the number of semaphores taken by the current task, which is indicated by the TAKEN_COUNT parameter in the corresponding PTT entry. Process 413 then populates an entry in PTT 302 for the task, setting the FIRST, LAST and VALID indicators of the entry.

If the SEM_ID does not match an entry in STT 304, process 410 transitions to process 414 to determine the number of semaphores taken by the current task, which is indicated by the TAKEN_COUNT parameter in the corresponding PTT entry. If the TAKEN_COUNT parameter is not less than two (2), then process 420 populates an entry in PTT 302 for the task, sets the TAKEN indicator to indicate the entry is allocated, and sets the TAKEN_COUNT parameter to two (2). After process 420 is complete, process 420 transitions to process 402. Referring back to process 416, if the TAKEN_COUNT parameter is less than two (2), then process 418 populates an entry in STT 304 for the task to indicate a semaphore has been acquired by the task. Note that any number of semaphores may be allocated by a task and the number "two" is used only as an example in method 400.

Referring back to process 402, when an UNLOCK_MODIFIED command is received, process 422 determines whether the SEM_ID allocated to the requesting task matches the SEM_ID of a taken entry in PTT 302. If the SEM_ID matches an entry in PTT 302, process 424 clears the VALID and TAKEN indicators for the task and the semaphore lock is released. In process 426, if the SEM_ID of the current task for which the semaphore lock is released matches an entry in PTT 302 for which the TAKEN indicator is not set and the FIRST indicator is set, then process 428 determines whether the TAKEN_COUNT parameter in the entry of the task for which the semaphore lock is released is less than two (2). If the TAKEN_COUNT parameter is less than two, then process 430 determines whether the LAST indicator of the matching entry is set, and if not, process 432 searches PTT 302 for the entry with a matching SEM_ID and an incremented SEQ_ID (i.e., SEQ_ID+1). Once the matching entry is found in process 432, process 434 sets the FIRST indicator of the matching entry and transitions to process 440 to set the TAKEN indicator of the entry in PTT 302. Process 440 transitions to process 402 to await the next LOCK_DMA or UNCLOCK_MODIFIED command.

Referring back to process 428, if the TAKEN_COUNT of the entry is less than two, process 435 determines whether the LAST indicator of the entry is set, and if so, process 442 clears the VALID indicator in PTT entry, and populates the entry corresponding to the task in STT 304 to indicate a semaphore has been acquired by the task. Process 442 transitions to process 402.

Referring back to process 435, if the LAST indicator of the matching entry is not set, process 436 searches PTT 302 for the entry with a matching SEM_ID and an incremented SEQ_ID (i.e., SEQ_ID+1). Once the matching entry is found in process 436, process 438 sets the FIRST indicator of the matching entry and transitions to process 440 to set the TAKEN indicator of the entry in PTT 302. Process 440 transitions to process 402 to await the next LOCK_DMA or UNCLOCK_MODIFIED command.

Referring back to process 426, if the SEM_ID of the current task for which the semaphore lock is released does not match an entry in PTT 302 for which the TAKEN indicator is not set and the FIRST indicator is set, then process 426 transitions to process 402.

Referring back to process 422, if the SEM_ID does not match a taken entry in PTT 302, process 444 determined whether the SEM_ID matches an entry in STT 304. If so, process 444 transitions to process 446 to clear the VALID indicator in STT entry of the current task and release the semaphore lock. Process 446 transitions to process 402. Process 444 transitions to process 402 when the SEM_ID does not match an entry in STT 304.

By now it should be appreciated that in some embodiments, there has been provided a multi-core system configured to execute a plurality of tasks and having a semaphore engine and a direct memory access (DMA) engine capable of selecting, by a task scheduler of a first core, a first task for execution by the first core. Executing the first task can comprise allocating (201) an entry in a workspace of the first core, and requesting a semaphore lock (202) of a first semaphore identified by a first semaphore identifier. In response to the semaphore lock request, the task scheduler of the first core can switch (203) the first task to an inactive state and select a next task for execution by the first core. In response to the semaphore lock request, the semaphore engine can acquire the semaphore lock (205, 206) of the first semaphore for the first task and, in response thereto, provide a data transfer request (207) to the DMA engine. In response to the data transfer request, the DMA engine can transfer data associated with the locked first semaphore to the entry of the workspace of the first core. After transferring the data, the task scheduler can switch (209) the first task from the inactive state to a ready for scheduling state so that the first task can be selected for execution by the task scheduler.

In another aspect, acquiring the semaphore lock of the first semaphore by the semaphore engine can comprise determining if the first semaphore is available ("no" from 404 and 410), wherein the semaphore engine acquires the semaphore lock in response to determining that the first semaphore identified by the semaphore identifier is available.

In another aspect, determining that the first semaphore is available can comprise determining that no other task is waiting to achieve lock of the first semaphore in response to a semaphore lock request for the first semaphore issued by another task prior to the first task requesting lock of the first semaphore (no from 404), and determining that the first semaphore is not currently locked by another task (no from 410).

In another aspect, the semaphore engine can be configured to maintain a semaphore taken list (STT) which includes a plurality of entries, each entry corresponding to a task. Each entry can be configured to store a semaphore identifier corresponding to a taken semaphore which was locked by the corresponding task. The method can further comprise storing the semaphore identifier in an entry of the semaphore taken list corresponding to the first task (418). The storing the semaphore identifier of the first semaphore in the semaphore taken list can indicate that the semaphore lock of the first semaphore has been acquired by the first task.

In another aspect, the semaphore engine can be configured to maintain a task pending list (PTT) which includes a plurality of entries, each entry corresponding to a task. Each entry can be configured to store a semaphore identifier corresponding to a pending semaphore that is waiting to be locked by the corresponding task. Determining if the semaphore identified by the semaphore identifier is available can comprise determining if the semaphore identifier matches a semaphore identifier stored in an entry of the task pending list (404).

In another aspect, in response to determining that the semaphore identifier matches a semaphore identifier stored in an entry of the task pending list, the method can further comprise updating an entry of the task pending list corresponding to the first task (406).

In another aspect, in response to determining that the semaphore identifier matches a semaphore identifier stored in an entry of the task pending list, the method can further comprise updating the matching entry of the task pending list (408).

In another aspect, each entry of the task pending list can further include a first indicator and a last indicator. Updating the entry of the task pending list corresponding to the first task can comprise setting the last indicator to indicate the first task is the latest task to request a semaphore lock of the pending semaphore (406), and updating the matching entry of the task pending list can comprise clearing the last indicator to indicate that the task of the matching entry is no longer the latest task to request a semaphore lock of the semaphore (408).

In another aspect, transferring, by the DMA engine, of the data associated with the locked first semaphore to the entry of the workspace of the first core can comprise transferring the data from one of an external memory or a workspace entry of a core which was allocated by another task.

In another aspect, during the semaphore engine acquiring the semaphore lock of the first semaphore for the first task, the next task selected for execution can be executed by the first core (203).

In another aspect, the method can further comprise selecting (210), by the task scheduler of the first core, the first task for continuing execution by the first core. The continuing execution comprises modifying the data stored in the entry of the workspace of the first core and requesting a semaphore unlock of the first semaphore. In response to the semaphore unlock request, the task scheduler of the first core can switch (212) the first task to the inactive state and selecting a second next task for execution by the first core. In response to the semaphore unlock request, the DMA engine can transfer (213, 214) the modified data associated with the first semaphore from the entry of the workspace of the first core to one of external memory or an entry of a workspace allocated by another task. After transferring the modified data, the semaphore engine can unlock (215) the first semaphore. After unlocking the first semaphore, the task scheduler can switch (216) the first task from the inactive state to the ready for scheduling state.

In another aspect, transferring the modified data can comprise, when there is no other task waiting to acquire lock of the first semaphore, the DMA engine transferring the modified data from the entry of the workspace of the first core to the external memory. When there is at least one other task waiting to acquire lock of the first semaphore, the method can further comprise selecting, by the semaphore engine, a task of the at least one other task to acquire lock of the first semaphore, and transferring, by the DMA engine, the modified data from the entry of the workspace of the first core to an entry of a workspace allocated by the selected task of the at least one other task.

In another embodiment, a multi-core system configured to execute a plurality of tasks can comprise a plurality of cores (102, 104, 106), each core having a workspace and a task scheduler which selects tasks for execution by the core, wherein when a selected task of a core requests a semaphore lock of a semaphore identified by a semaphore identifier, the task scheduler of the core executing the selected task can be configured to, in response to the semaphore lock request, switch (203) the selected task to an inactive state such that a next task for execution can be selected for execution by the core. A semaphore engine (110) coupled to the plurality of cores can be configured to, in response to the semaphore lock request by the selected task, acquire the semaphore lock (205, 206) of the semaphore for the selected task and provide a data transfer request (207) when the semaphore lock is acquired. A direct memory access (DMA) engine (114) coupled to the semaphore engine and the plurality of cores, can be configured to, in response to the data transfer request from the semaphore engine, transfer (208) data associated with the locked semaphore to the workspace of the core which executed the selected task. After the data transfer is complete, the task scheduler which selected the selected task can be configured to switch (209) the selected task from the inactive state to a ready for scheduling state so that the selected task can again be selected for execution.

In another aspect, the semaphore engine can be configured to store a semaphore taken list (STT) which includes a plurality of entries, each entry corresponding to a task, wherein each entry is configured to store a semaphore identifier corresponding to a taken semaphore which was locked by the corresponding task, and store a task pending list (PTT) which includes a plurality of entries, each entry corresponding to a task, wherein each entry can be configured to store a semaphore identifier.

In another aspect, each entry of the PTT is configured to store a taken indicator which indicates whether the semaphore identifier stored in the entry corresponds to a pending semaphore that is waiting to be locked by the corresponding task or a taken semaphore which has been locked by the corresponding task.

In another aspect, each task of the plurality of tasks is able to take up to a predetermined maximum number of semaphores, wherein a first portion of the predetermined maximum number of taken semaphores can be stored in the semaphore taken list and a second portion of the predetermined maximum number of taken semaphores can be stored in the task pending list.

In another aspect, for each entry of the PTT which corresponds to a pending semaphore, the entry can be further configured to store: a last indicator to indicate that the task corresponding to the entry is the latest task to request a semaphore lock of the pending semaphore, and a first indicator to indicate that the task corresponding to the entry is the earliest task to request a semaphore lock of the pending semaphore.

In another aspect, the semaphore engine can be configured to acquire the semaphore lock of the semaphore for the selected task when the task pending list and the semaphore taken list indicate that no other task is waiting to achieve lock of the semaphore and when the semaphore is not currently locked by another task ("no" from 404 and 410).

In a further embodiment, a multi-core system configured to execute a plurality of tasks can comprise a plurality of cores, each core having a workspace and a task scheduler which selects tasks for execution by the core, and a semaphore engine (110) coupled to the plurality of cores. The semaphore engine can be configured to store: a semaphore taken list (STT) which includes a plurality of entries, each entry corresponding to a task, wherein each entry is configured to store a semaphore identifier corresponding to a taken semaphore which was locked by the corresponding task, and a task pending list (PTT) which includes a plurality of entries, each entry corresponding to a task, wherein each entry is configured to store a semaphore identifier. Each entry of the PTT can be configured to store a taken indicator which indicates whether the semaphore identifier stored in the entry corresponds to a pending semaphore that is waiting to be locked by the corresponding task or a taken semaphore which has been locked by the corresponding task.

In another aspect, for each entry of the PTT which corresponds to a pending semaphore, the entry can be further configured to store: a last indicator to indicate that the task corresponding to the entry is the latest task to request a semaphore lock of the pending semaphore, and a first indicator to indicate that the task corresponding to the entry is the earliest task to request a semaphore lock of the pending semaphore.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

The term "thread", "task" or "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a multi-core system configured to execute a plurality of tasks and having a semaphore engine and a direct memory access (DMA) engine, a method comprises:
   selecting, by a task scheduler of a first core, a first task for execution by the first core, wherein executing the first task comprises allocating an entry in a workspace memory of the first core, and requesting a semaphore lock of a first semaphore identified by a first semaphore identifier;
   in response to the semaphore lock request, the task scheduler of the first core switching the first task to an inactive state and selecting a next task for execution by the first core;
   in response to the semaphore lock request, the semaphore engine, acquiring the semaphore lock of the first semaphore for the first task;
   in response to acquiring the semaphore lock of the first semaphore for the first task, the semaphore engine providing a data transfer request to the DMA engine;
   in response to the data transfer request, transferring, by the DMA engine, data associated with the locked first semaphore to the entry of the workspace memory of the first core;
   after the transferring the data, the task scheduler switching the first task from the inactive state to a ready for scheduling state so that the first task can be selected for execution by the task scheduler;
   when there is no other task waiting to acquire lock of the first semaphore, the DMA engine transferring modified data from the entry of the workspace memory of the first core to external memory; and
   when there is at least one other task waiting to acquire lock of the first semaphore, the method further comprises:
      selecting, by the semaphore engine, a task of the at least one other task to acquire lock of the first semaphore; and
      transferring, by the DMA engine, the modified data from the entry of the workspace memory of the first core to an entry of a workspace allocated by the selected task of the at least one other task.

2. The method of claim 1, wherein acquiring the semaphore lock of the first semaphore by the semaphore engine comprises:
   determining if the first semaphore is available, wherein the semaphore engine acquires the semaphore lock in response to determining that the first semaphore identified by the semaphore identifier is available.

3. The method of claim 2, wherein determining that the first semaphore is available comprises:
   determining that no other task is waiting to achieve lock of the first semaphore in response to a semaphore lock request for the first semaphore issued by another task prior to the first task requesting lock of the first semaphore; and
   determining that the first semaphore is not currently locked by another task.

4. The method of claim 2 wherein the semaphore engine is configured to maintain a semaphore taken list (STT) which includes a plurality of entries, each entry corresponding to a task, wherein each entry is configured to store a semaphore identifier corresponding to a taken semaphore which was locked by the corresponding task, wherein the method further comprises:

storing the semaphore identifier in an entry of the semaphore taken list corresponding to the first task, wherein the storing the semaphore identifier of the first semaphore in the semaphore taken list indicates that the semaphore lock of the first semaphore has been acquired by the first task.

5. The method of claim 2, wherein the semaphore engine is configured to maintain a task pending list (PTT) which includes a plurality of entries, each entry corresponding to a task, wherein each entry is configured to store a semaphore identifier corresponding to a pending semaphore that is waiting to be locked by the corresponding task, wherein the determining if the semaphore identified by the semaphore identifier is available comprises:

determining if the semaphore identifier matches another semaphore identifier stored in an entry of the task pending list.

6. The method of claim 5, wherein, in response to determining that the semaphore identifier matches another semaphore identifier stored in an entry of the task pending list, the method further comprises:

updating the entry of the task pending list corresponding to the first task.

7. The method of claim 6, wherein, in response to determining that the semaphore identifier matches a semaphore identifier stored in an entry of the task pending list, the method further comprises:

updating the matching entry of the task pending list.

8. The method of claim 7, wherein each entry of the task pending list further includes a first indicator and a last indicator, wherein:

updating the entry of the task pending list corresponding to the first task comprises setting the last indicator to indicate the first task is the latest task to request the semaphore lock of the pending semaphore; and updating the matching entry of the task pending list comprises clearing the last indicator to indicate that the task of the matching entry is no longer the latest task to request the semaphore lock of the semaphore.

9. The method of claim 1, wherein the transferring, by the DMA engine, of the data associated with the locked first semaphore to the entry of the workspace memory of the first core comprises transferring the data from one of an external memory or a workspace entry of a core which was allocated by another task.

10. The method of claim 1, wherein, during the semaphore engine acquiring the semaphore lock of the first semaphore for the first task, the next task selected for execution is executed by the first core.

11. The method of claim 1, further comprising:

selecting, by the task scheduler of the first core, the first task for continuing execution by the first core, wherein the continuing execution comprises modifying the data stored in the entry of the workspace memory of the first core and requesting a semaphore unlock of the first semaphore to generate the modified data;

in response to the semaphore unlock request, the task scheduler of the first core switching the first task to the inactive state and selecting a second next task for execution by the first core;

in response to the semaphore unlock request, transferring, by the DMA engine, the modified data associated with the first semaphore from the entry of the workspace memory of the first core to one of the external memory or an entry of a workspace memory allocated by another task;

after the transferring the modified data, unlocking, by the semaphore engine, the first semaphore; and after unlocking the first semaphore, the task scheduler switching the first task from the inactive state to the ready for scheduling state.

12. A multi-core system configured to execute a plurality of tasks, comprising:

a plurality of cores, each core having a workspace memory and a task scheduler which selects tasks for execution by the core, wherein when a selected task of a core requests a semaphore lock of a semaphore identified by a semaphore identifier, the task scheduler of the core executing the selected task is configured to, in response to the semaphore lock request, switch the selected task to an inactive state such that a next task for execution can be selected for execution by the core;

a semaphore engine coupled to the plurality of cores, wherein the semaphore engine is configured to,
in response to the semaphore lock request by the selected task, acquire the semaphore lock of the semaphore for the selected task and provide a data transfer request when the semaphore lock is acquired; and
when there is at least one other task waiting to acquire lock of the first semaphore, select a task of the at least one other task to acquire lock of the first semaphore;

a direct memory access (DMA) engine coupled to the semaphore engine and the plurality of cores, wherein the DMA engine is configured to,
in response to the data transfer request from the semaphore engine, transfer data associated with the locked semaphore to the workspace memory of the core which executed the selected task, wherein after the data transfer is complete, the task scheduler which selected the selected task is configured to switch the selected task from the inactive state to a ready for scheduling state so that the selected task can again be selected for execution;
when there is no other task waiting to acquire lock of the first semaphore, transfer modified data from the entry of the workspace memory of the first core to external memory; and
transfer the modified data from the entry of the workspace memory of the first core to an entry of a workspace allocated by the selected task of the at least one other task.

13. The multi-core system of claim 12, wherein the semaphore engine is configured to:

store a semaphore taken list (STT) which includes a plurality of entries, each entry corresponding to a task, wherein each entry is configured to store a semaphore identifier corresponding to a taken semaphore which was locked by the corresponding task; and store a task pending list (PTT) which includes a plurality of entries, each entry corresponding to a task, wherein each entry is configured to store a semaphore identifier.

14. The multi-core system of claim 13, wherein each entry of the PTT is configured to store a taken indicator which indicates whether the semaphore identifier stored in the entry corresponds to a pending semaphore that is waiting to be locked by the corresponding task or a taken semaphore which has been locked by the corresponding task.

15. The multi-core system of claim 14, wherein each task of the plurality of tasks is able to take up to a predetermined maximum number of semaphores, wherein a first portion of the predetermined maximum number of taken semaphores is stored in the semaphore taken list and a second portion of the predetermined maximum number of taken semaphores is stored in the task pending list.

16. The multi-core system of claim 14, wherein for each entry of the PTT which corresponds to a pending semaphore, the entry is further configured to store:
a last indicator to indicate that the task corresponding to the entry is the latest task to request a semaphore lock of the pending semaphore, and
a first indicator to indicate that the task corresponding to the entry is the earliest task to request a semaphore lock of the pending semaphore.

17. The multi-core system of claim 13, wherein the semaphore engine is configured to acquire the semaphore lock of the semaphore for the selected task when the task pending list and the semaphore taken list indicate that no other task is waiting to achieve lock of the semaphore and when the semaphore is not currently locked by another task.

18. A multi-core system configured to execute a plurality of tasks, comprising:
a plurality of cores, each core having a workspace memory and a task scheduler which selects tasks for execution by the core; and
a semaphore engine coupled to the plurality of cores, wherein the semaphore engine is configured to store:
a semaphore taken list (SIT) which includes a plurality of entries, each entry corresponding to a task, wherein each entry is configured to store a semaphore identifier corresponding to a taken semaphore which was locked by the corresponding task, and
a task pending list (PTT) which includes a plurality of entries, each entry corresponding to a task, wherein each entry is configured to store a semaphore identifier,
wherein each entry of the PTT is configured to store a taken indicator which indicates whether the semaphore identifier stored in the entry corresponds to a pending semaphore that is waiting to be locked by the corresponding task,
further wherein for each entry of the PTT which corresponds to a pending semaphore, the entry is further configured to store:
a last indicator to indicate that the task corresponding to the entry is the latest task to request a semaphore lock of the pending semaphore, and
a first indicator to indicate that the task corresponding to the entry is the earliest task to request a semaphore lock of the pending semaphore.

* * * * *